US008299747B2

(12) United States Patent
Hsieh et al.

(10) Patent No.: US 8,299,747 B2
(45) Date of Patent: Oct. 30, 2012

(54) SINGLE-STAGE ZERO-CURRENT SWITCHING DRIVING CIRCUIT FOR ULTRASONIC MOTOR

(75) Inventors: Yao-Ching Hsieh, Kaohsiung (TW); Cheng-Yen Chen, Kaohsiung (TW); Jian-Yi Hong, Kaohsiung (TW); Po-Wen Hsueh, Kaohsiung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 226 days.

(21) Appl. No.: 12/911,109

(22) Filed: Oct. 25, 2010

(65) Prior Publication Data

US 2011/0095711 A1 Apr. 28, 2011

(30) Foreign Application Priority Data

Oct. 26, 2009 (TW) .............................. 98136226 A

(51) Int. Cl.
*H02P 27/04* (2006.01)
(52) U.S. Cl. ........ 318/800; 318/129; 318/135; 323/259; 323/344
(58) Field of Classification Search .................. 318/800, 318/129, 135; 323/259, 344
See application file for complete search history.

(56) References Cited

U.S. PATENT DOCUMENTS

| | | | |
|---|---|---|---|
| 6,489,705 B1 * | 12/2002 | Ouyang et al. ........... | 310/323.02 |
| 6,573,636 B1 * | 6/2003 | Iino et al. ................. | 310/316.01 |
| 8,076,920 B1 * | 12/2011 | Melanson .................... | 323/299 |
| 2006/0072353 A1 * | 4/2006 | Mhaskar et al. .............. | 363/80 |
| 2012/0043899 A1 * | 2/2012 | Veskovic ................. | 315/200 R |
| 2012/0043900 A1 * | 2/2012 | Chitta et al. .................. | 315/201 |

* cited by examiner

*Primary Examiner* — Bentsu Ro
*Assistant Examiner* — Erick Glass
(74) *Attorney, Agent, or Firm* — WPAT, P.C.; Anthony King

(57) ABSTRACT

The present invention relates to a single-stage zero-current switching driving circuit for ultrasonic motor, which comprises: a buck-boost converter and a zero-current switching resonant inverter. The driving circuit according to the present invention integrates the buck-boost converter and the resonant inverter into a single-stage structure, so that the buck-boost converter and the resonant inverter share an active switch and a trigger signal, and therefore, the circuit is simplified and the loss caused by stage switching is reduced. Moreover, the buck-boost converter operates in a discontinuous-conduction mode (DCM), which allows the circuit to have high power factor, and enables the active switch to be capable of zero-current switching (ZCS), so that the loss caused by switching is largely reduced. In the driving circuit according to the present invention, there's no interaction of power between the buck-boost converter and the resonant inverter, so that the two circuits can be analyzed individually. Therefore, the driving circuit according to the present invention having simplified circuit, low loss caused by switching, and low manufacturing cost, can be a competitive product after being commercialized.

7 Claims, 5 Drawing Sheets

SINGLE-STAGE ZERO-CURRENT SWITCHING DRIVING CIRCUIT FOR ULTRASONIC MOTOR

BACKGROUND OF THE INVENTION

1. Field of the Invention

The present invention relates to a single-stage zero-current switching driving circuit, and more particularly to a single-stage zero-current switching driving circuit for ultrasonic motor.

2. Description of the Related Art

FIG. 1 shows a circuit diagram of a conventional buck-boost power factor correction circuit. The conventional buck-boost power factor correction circuit 10 comprises a rectification circuit 11, an active switch 12, an inductor 13, a diode 14 and a capacitor 15. In which, the active switch 12 is a power device MOSFET (Metal-oxide-semiconductor Field-effect Transistor), and a control circuit 17 is used to generate a trigger signal ($v_{gs}$) to drive the active switch 12 at high frequency. For achieving high power factor, the current of the inductor 13 is designed to operate in a discontinuous-conduction mode (DCM), and the switching frequency and the conduction rate of the active switch 12 are fixed during the whole period of AC power source voltage.

FIG. 2 shows waveforms of an inductor current and the trigger signal. In which, $d_r$ and $T_s$ represents the conduction rate and the switching period of the active switch 12 respectively, the operation theory is described below:

The input AC voltage is represented by equation (1) below.

$$v_s = V_m \sin(2\pi ft) \quad (1)$$

In which, f represents the frequency of the AC power source voltage, $V_m$ represents the peak value of the AC voltage. In realistic design, the switching frequency $f_s$ of the active switch 12 is far greater than the frequency f of the AC power source. Under this assumption, in each high frequency switching period, the rectified voltage ($v_{rec}$) can be seen as a fixed value.

When $0 \leq t \leq d_r T_s$, the inductor current ($i_p$) increases linearly, the equation is shown below:

$$i_p(t) = \frac{V_{rec}(t)}{L_p} t \quad 0 \leq t \leq d_r T_s \quad (2)$$

When $t = d_r T_s$, the inductor current reaches the maximum of each switching period, the peak value of the current of the inductor 13 is represented below:

$$I_{p,peak}(t) = \frac{V_m |\sin(2\pi ft)|}{L_p} d_r T_s \quad (3)$$

When $d_r T_s \leq t < T_s$, the active switch 12 is closed, the inductor current flows through the flywheel diode 14 to charge the DC-link capacitor 15, the inductor current starts to decrease linearly, the inductor 13 operates in a discontinuous-conduction mode (DCM), so that the inductor current will decrease to zero before next switching period, for the time being the inductor current is represented below:

$$i_p(t) = -\frac{V_{dc}}{L_p}(t - d_r T_s) + I_{p,peak(t)} \quad d_r T_s \leq t < T_s \quad (4)$$

In which, $V_{dc}$ represents a DC-link voltage.

Only during the period when the inductor current increases, the input current flows through the active switch 12, and the switch current (the input current) appears to be a sawtooth wave, so that the average value of the input current of each switching period is represented below:

$$i_{in,avg}(t) = \frac{d_r T_s \cdot I_{p,peak}(t)}{2T_s} = \frac{V_m d_r^2 T_s}{2L_p} |\sin(2\pi ft)| \quad (5)$$

As shown in equation (5), if the conduction rate $d_r$ and the switching period of the active switch 12 are fixed in each input power source period, the average current is only related to the input voltage, so that we only need to put a small filter capacitor at the input terminal to eliminate high frequency composition, and the input current will be a sine wave, the average input current is represented below:

$$i_{in}(t) = \frac{V_m d_r^2 T_s}{2L_p} \sin(2\pi ft) \quad (6)$$

As shown in equation (6), the input current follows and is in phase with the wave of the input voltage, so that not only high power factor is accomplished, but also the total harmonic distortion of the input current is restrained to an extremely small amount. In a period of the frequency of the AC power source voltage, the output power is:

$$P_{in} = \frac{1}{2\pi} \int_0^{2\pi} V_m \sin(2\pi ft) \cdot i_{in}(t) d(2\pi ft) = \frac{V_m^2}{4L_p} d_r^2 T_s \quad (7)$$

When the integration of the voltage of the energy storage inductor to time is smaller than zero, the buck-boost power factor correction circuit operates in a discontinuous-conduction mode (DCM).

$$V_m |\sin(2\pi ft)| \cdot d_r T_s + V_{dc} \cdot (1 - d_r) T_s \leq 0 \quad (8)$$

As shown in equation (8), if the buck-boost power factor correction circuit can operates in a discontinuous-conduction mode (DCM) when inputting the peak value of the voltage, the buck-boost power factor correction circuit can surely operate in a discontinuous-conduction mode (DCM) at any value of the input voltage, and therefore the DC-link voltage ($V_{dc}$) must be high enough and satisfies the following equation:

$$V_{dc} \leq V_m \cdot d_r / (1 - d_r) \quad (9)$$

FIG. 3 shows a circuit diagram of a conventional driving circuit. The conventional driving circuit 20 comprises a low pass filter 21, a rectifier 22, a buck-boost converter 35 and a class E resonant inverter 36. The buck-boost converter 35 comprises a first diode 23, a second diode 24, a first inductor 25, a first capacitor 26, an active switch 27. The class E resonant inverter 36 comprises the first capacitor 26, the active switch 27, a second capacitor 28, a second inductor 29, a third inductor 31, a third capacitor 32. The buck-boost converter 35 and the class E resonant inverter 36 share the first capacitor 26 and the active switch 27.

The conventional driving circuit 20 integrating the buck-boost converter 35 and the class E resonant inverter 36, which was proposed by Ed Deng and Slobodan Ćuk in 1995, has the advantages of having simple circuit structure and good circuit performance. But because of the circuit structure, there's interaction of energy between the buck-boost converter 35 and the class E resonant inverter 36, the input power is not entirely transmitted to the class E resonant inverter 36 by the buck-boost converter 35, and part of the energy is transmitted from the input terminal to the class E resonant inverter 36, and therefore the buck-boost converter 35 can not accomplish the aim of power factor correction.

Moreover, referring to prior related researches, for example, "Genetic Algorithm Control of the Linear Piezo-electric Ceramic Motor Driving System", proposed by Department of Electrical Engineering, Yuan Ze University in July 2005, and the thesis obtains the invention patent No. I271024, the circuit structure of the patent is that using LC current source to resonate in parallel and generate LLCC resonance circuit supplied by AC voltage. The LLCC resonance technique is utilized to obtain six stage LC resonant inverter for driving voltage of the motor. The most disadvantage of this method is that the circuit is very complicated, the difficulty of controlling the circuit is relatively increased, and the manufacturing cost is largely increased. Therefore, it lacks the value of being commercialized.

Therefore, it is necessary to provide a single-stage zero-current switching driving circuit for ultrasonic motor to solve the above problems.

SUMMARY OF THE INVENTION

The present invention is directed to a single-stage zero-current switching driving circuit for ultrasonic motor, which comprises: a buck-boost converter and a zero-current switching resonant inverter. The buck-boost converter receives an input voltage, the buck-boost converter comprises a first diode, a first inductor, a first capacitor and an active switch. The buck-boost converter operates in a discontinuous-conduction mode (DCM), before the trigger pulse cycle of a trigger signal of the active switch, the current of the first inductor decreases to zero. The zero-current switching resonant inverter is connected to the buck-boost converter, the resonant inverter comprises a second inductor, two blocking diodes, a second diode, a second capacitor and a resonant circuit, the two blocking diodes are used to block the interaction of power between the buck-boost converter and the resonant inverter, the resonant inverter generates a high frequency AC voltage so as to drive the ultrasonic motor.

The driving circuit according to the present invention integrates the buck-boost converter and the resonant inverter into a single-stage structure, so that the buck-boost converter and the resonant inverter share an active switch and a trigger signal, and therefore, the circuit is simplified and the loss caused by stage switching is reduced. Moreover, the buck-boost converter operates in a discontinuous-conduction mode (DCM), which allows the circuit to have high power factor, and enables the active switch to be capable of zero-current switching (ZCS), so that the loss caused by switching is largely reduced. In the driving circuit according to the present invention, there's no interaction of power between the buck-boost converter and the resonant inverter, so that the two circuits can be analyzed individually. Moreover, one end of the active switch is grounded, so that the driving circuit according to the present invention has no isolating issue, and the complexity of the circuit and the cost are reduced. Therefore, the driving circuit according to the present invention having simplified circuit, low loss caused by switching, and low manufacturing cost, can be a competitive product after being commercialized.

DETAILED DESCRIPTION OF THE INVENTION

Figure 1:
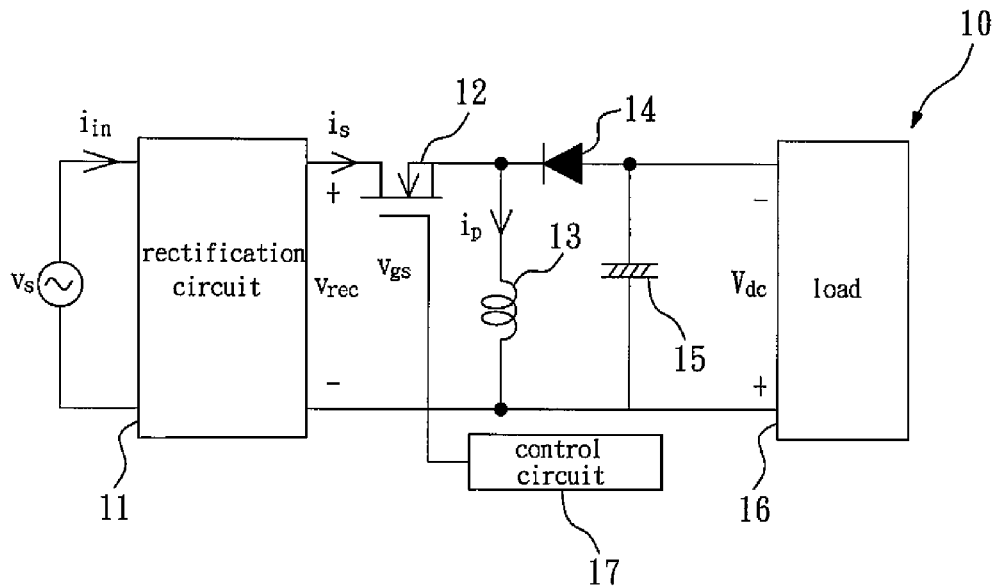
FIG. 1 shows a circuit diagram of a conventional buck-boost power factor correction circuit.
Figure 2:
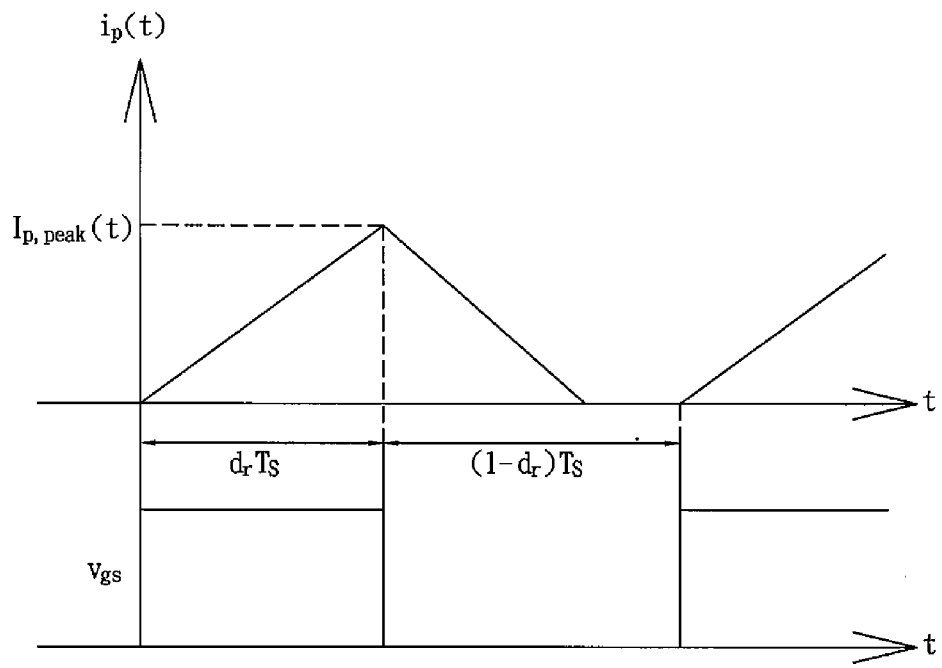
FIG. 2 shows waveforms of an inductor current and a trigger signal.
Figure 3:
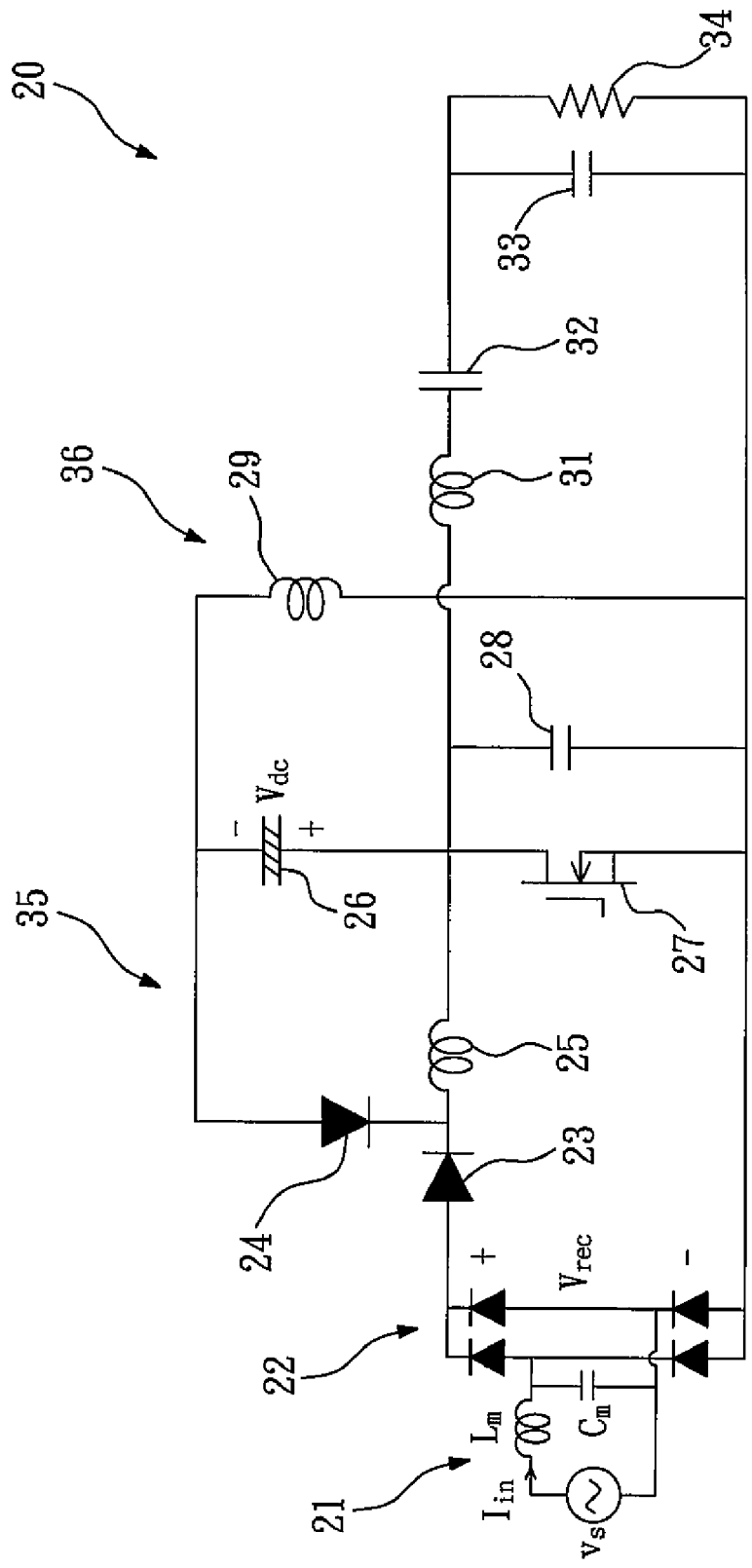
FIG. 3 shows a circuit diagram of a conventional driving circuit.
Figure 4:
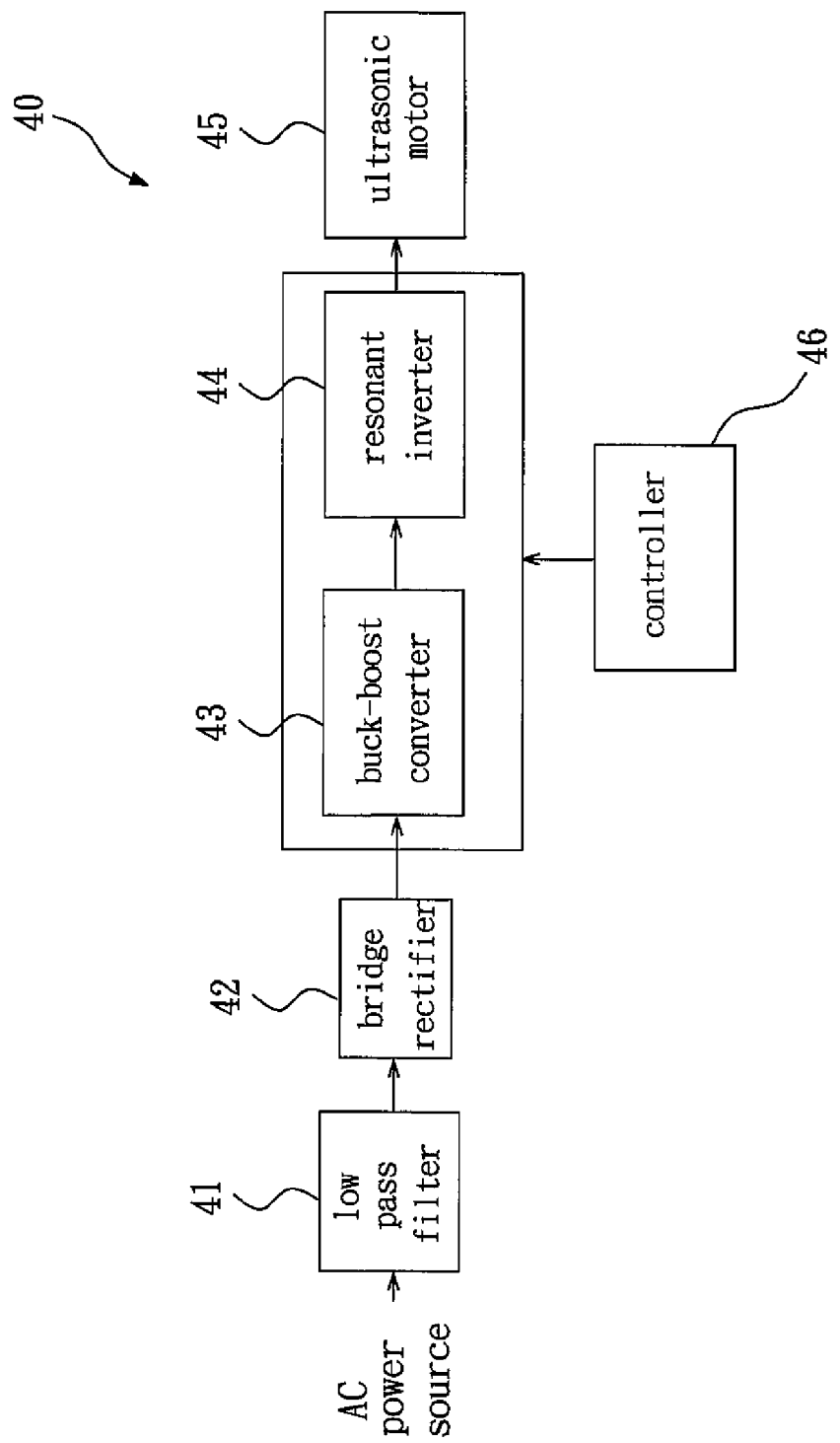
FIG. 4 shows a block diagram of a single-stage zero-current switching driving circuit for ultrasonic motor according to the present invention.
Figure 5:
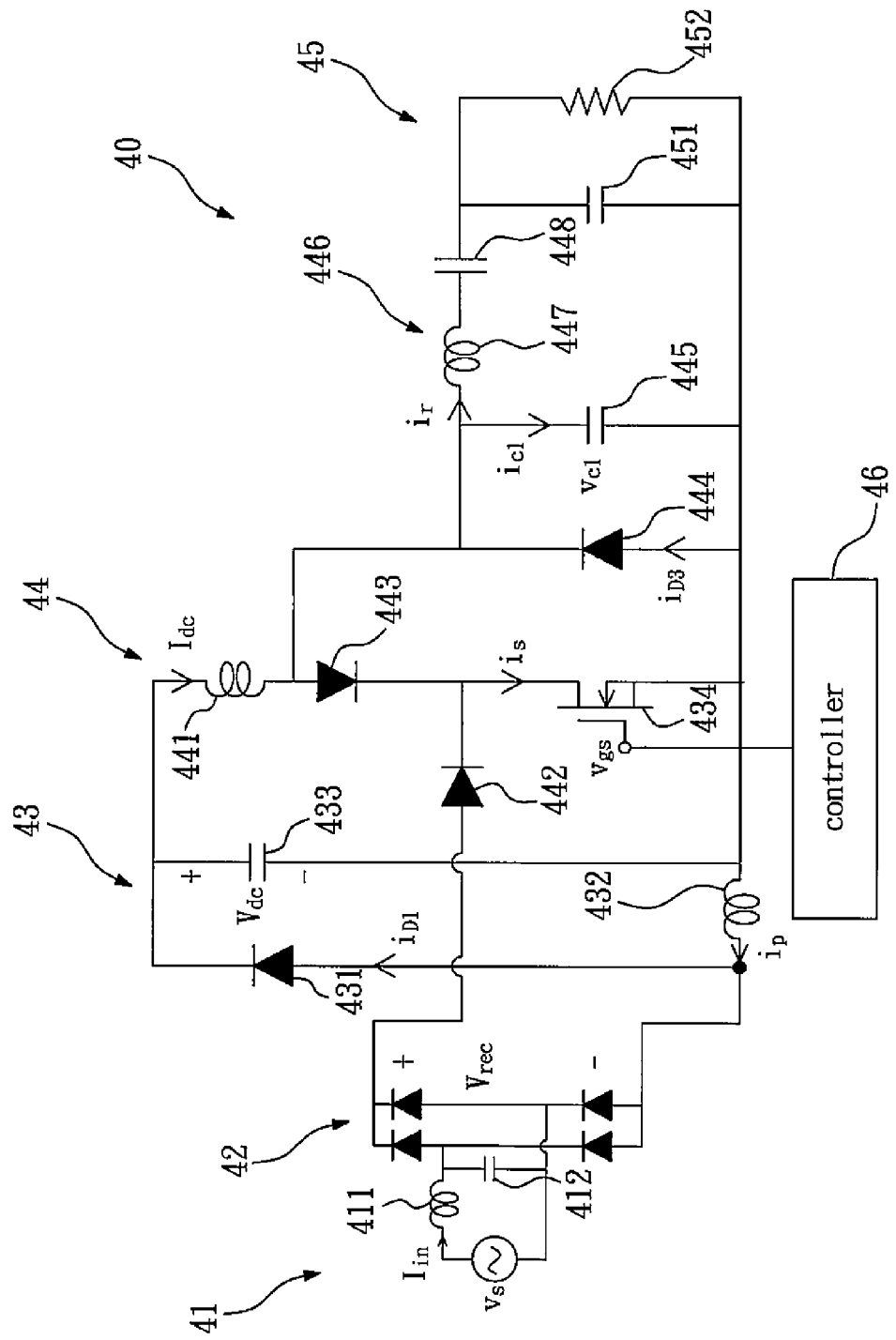
FIG. 5 shows a circuit diagram of the single-stage zero-current switching driving circuit for ultrasonic motor according to the present invention.

FIG. 4 shows a block diagram of a single-stage zero-current switching driving circuit for ultrasonic motor according to the present invention. FIG. 5 shows a circuit diagram of the single-stage zero-current switching driving circuit for ultrasonic motor according to the present invention. Referring to FIGS. 4 and 5, the single-stage zero-current switching driving circuit 40 for ultrasonic motor according to the present invention comprises: a low pass filter 41, a bridge rectifier 42, a buck-boost converter 43 and a zero-current switching resonant inverter 44. The low pass filter 41 comprises a filter inductor 411 and a filter capacitor 412, the bridge rectifier 42 comprises four rectifier diodes, the low pass filter 41 and the bridge rectifier 42 are used to filter and rectify an AC power source into a DC input power source ($v_{rec}$), and the DC input power source is inputted into the buck-boost converter 43.

The buck-boost converter 43 receives the DC input power source ($v_{rec}$), the buck-boost converter 43 comprises a first diode 431, a first inductor 432, a first capacitor 433 and an active switch 434. The buck-boost converter operates in a discontinuous-conduction mode (DCM), before the trigger pulse cycle of a trigger signal of the active switch 434, the current ($i_p$) of the first inductor 432 decreases to zero.

In the embodiment, the first diode 431 and the first inductor 432 are connected to a negative terminal of the DC input power source ($v_{rec}$), two ends of the first capacitor 433 are respectively connected to the first diode 431 and the first inductor 432, the active switch 434 is connected to the first capacitor 433 and the first inductor 432. The first diode 431 is a flywheel diode.

The zero-current switching resonant inverter 44 is connected to the buck-boost converter 43, the resonant inverter 44 comprises a second inductor 441, two blocking diodes 442, 443, a second diode 444, a second capacitor 445 and a resonant circuit 446. The two blocking diodes 442, 443 are used to block the interaction of power between the buck-boost converter 43 and the resonant inverter 44, the resonant inverter 44 generates a high frequency AC voltage so as to drive the ultrasonic motor 45.

In the embodiment, the zero-current switching resonant inverter 44 further comprises: the first capacitor 433 and the active switch 434, that is, the buck-boost converter 43 and the resonant inverter 44 share the first capacitor 433 and the active switch 434, the active switch 434 is capable of zero-current switching (ZCS), the two blocking diodes 442, 443 comprise a first blocking diode 442 and a second blocking diode 443, the first blocking diode 442 is connected to a positive terminal of the DC input power source ($v_{rec}$), the second blocking diode 443 is connected to the first blocking diode 442, two ends of the second inductor 441 are respectively connected to the second blocking diode 443 and the first capacitor 433, the active switch 434 is connected to the first blocking diode 442 and the second blocking diode 443, the second diode 444 is connected to the second blocking diode 443 and the second inductor 441, the second diode 444 and the second capacitor 445 are connected in parallel. The resonant circuit 446 is connected to the second capacitor 445. The second diode 444 is a flywheel diode.

In the embodiment, the resonant circuit 446 comprises a third inductor 447 and a third capacitor 448, the resonant frequency of the resonant circuit 446 is 70 kHz. The ultrasonic motor 45 is represented as a capacitive load 451 and a resistive load 452. The driving circuit 40 according to the present invention further comprises a controller 46, which is used to provide the trigger signal of the active switch 434.

In order to analyze conveniently, the assumptions of the circuit of FIG. 5 are made as follows:

(1) all switch components are ideal, the conducting state is considered as a short circuit, the cut-off state is considered as an open circuit.

(2) the first capacitor 433 is a DC-link capacitor, the first capacitor 433 and the second inductor 441 are huge, so that the voltage $V_{dc}$ of the first capacitor 433 and the DC current $I_{dc}$ of the second inductor 441 can be considered as the DC voltage source and the DC current source.

(3) the frequency of the power source is far smaller than the switching frequency ($f_s$) of the active switch 434. Therefore, in each high frequency operation period, the input voltage can be considered as a fixed value.

(4) the quality factor $Q_L$ of the resonant circuit 446 is high enough to consider the resonant current $i_r$, which flows through the third inductor 447 and the third capacitor 448, as a sine wave.

In order to increase the efficiency of the circuit and improve the power factor, the buck-boost converter according to the present invention is designed to operate in a discontinuous-conduction mode (DCM), that is, before next pulse cycle of the trigger signal, the current ($i_p$) of the first inductor 432 must be decreased to zero. Also, the second diode 444 is a flywheel diode, when the active switch 434 is conducted, the voltage $v_{c1}$ of the second capacitor 445 equals −0.7V, so that the energy stored in the second capacitor 445 is almost zero, which enables the active switch to be capable of zero-current switching (ZCS), and the conducting loss is minimum.

Figure 6:
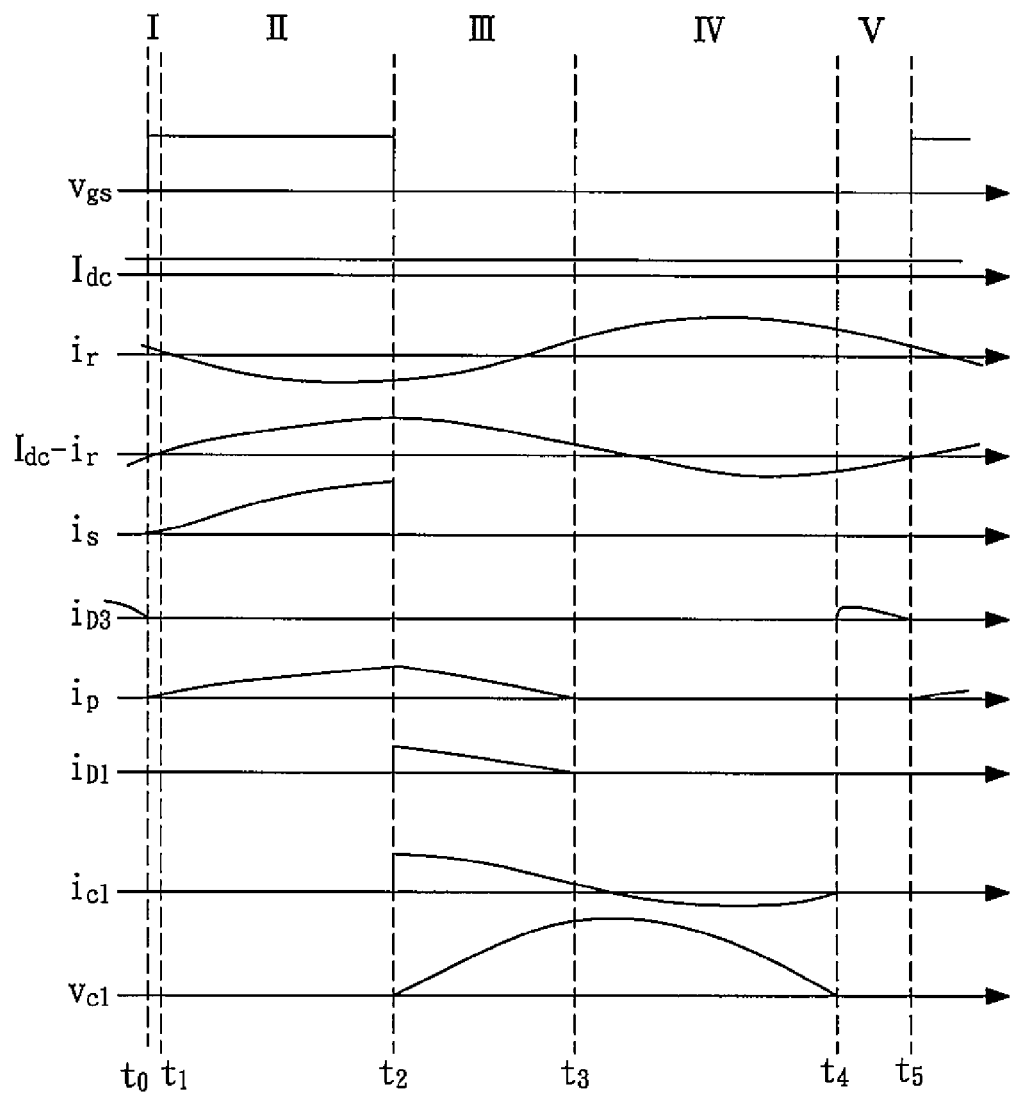
FIG. 6 shows theoretical waveforms of each operating mode with each voltage and current on the circuit.

According to the above-mentioned assumptions, in a high frequency period, regarding to the conducting state of the switch components, the analysis of the circuit can be divided in to five operating modes. FIG. 6 shows theoretical waveforms of each operating mode with each voltage and current on the circuit. Referring to FIGS. 5 and 6, the five operating modes are illustrated below.

a. Operating Mode I $\{t_0 \leq t \leq t_1\}$

Before entering operating mode I, the difference between the DC current $I_{dc}$ and the resonant current ($i_r$) is negative, the ($i_{dc}-i_r$) current flows through the second diode 444. When the trigger signal ($v_{gs}$) of the active switch 434 changes from low level to high level, the active switch 434 is conducted, for the time being the circuit enters operating mode I. Because the active switch 434 is conducted, the AC power source is rectified by the bridge rectifier 42 and becomes a DC input power source ($v_{rec}$) across the first inductor 432, and the first inductor 432 is used to store energy. Because the current of the first inductor 432 is designed to operate in a discontinuous-conduction mode (DCM), the current ($i_p$) of the first inductor 432 will increase linearly from zero. If the conduction rate is fixed, the rising slope of the current ($i_p$) of the first inductor 432 is proportional to the rectified DC input power source ($v_{rec}$), the current ($i_s$) flows through the active switch 434 equals the current ($i_p$) of the first inductor 432. Meanwhile, ($i_{dc}-i_r$) is still negative, and part of the current flows through the second diode 444. When ($I_{dc}-i_r$) is positive, the second diode 444 is cut off, and for the time being the circuit enters operating mode II.

b. Operating Mode II $\{t_1 < t < t_2\}$

When entering operating mode II, for the time being the trigger signal ($v_{gs}$) is still in high level, the inductor current ($i_p$) keeps increasing linearly. ($i_{dc}-i_r$) is positive, and the ($i_{dc}-i_r$) current flows through the second blocking diode 443 to the active switch 434, until the trigger signal ($v_{gs}$) changes to low level, for the time being the active switch 434 is cut off, the current ($i_p$) of the first inductor 432 reaches the peak value, and the circuit enters operating mode III.

c. Operating Mode III $\{t_2 \leq t \leq t_3\}$

Entering operating mode III, the active switch 434 is cut off, and the current ($i_p$) of the first inductor 432 charges the first capacitor 433 through the first diode 431, and the voltage ($V_{dc}$) of the first capacitor 433 crosses the first inductor 432. The current ($i_p$) of the first inductor 432 starts to decrease linearly, because the peak value of the current ($i_p$) of the first inductor 432 is proportional to the DC input power source ($v_{rec}$), the time that the current ($i_p$) of the first inductor 432 needs to be decreased to zero varies according to the amount of the DC input power source ($v_{rec}$). The ($I_{dc}-i_r$) current originally flows into the active switch 434, now flows into the second capacitor 445 and charges the second capacitor 445, the voltage ($v_{c1}$) of the second capacitor 445 increases gradually from zero.

d. Operating Mode IV $\{t_3 < t < t_4\}$

In this operating mode, when the current ($I_{dc}-i_r$) equals zero, the voltage ($v_{c1}$) of the second capacitor 445 reaches maximum. After that the current ($i_{dc}-i_r$) changes from positive to negative, the second capacitor 445 starts to discharge, for the time being the voltage ($v_{c1}$) of the second capacitor 445 starts to decrease. When the voltage ($v_{c1}$) of the second capacitor 445 is decreased to −0.7V, the second diode 444 is conducted, the current ($I_{dc}-i_r$) originally flows through the second capacitor 445, now flows through the second diode 444, for the time being the circuit enters operating mode V.

e. Operating Mode V $\{t_4 < t < t_5\}$

In this operating mode, the trigger signal ($v_{gs}$) is still at low level, the current ($I_{dc}-i_r$) flows through the second diode 444, until the trigger signal ($v_{gs}$) changes from low level to high level, for the time being because the buck-boost converter operates in a discontinuous-conduction mode (DCM), the current of the first inductor 432 is zero, and the current ($I_{dc}-i_r$) flows through the second diode 444, and does not flow through the active switch 434, the active switch 434 is capable of zero-current switching (ZCS), so as to reduce the loss caused by switching and increase the whole switching efficiency of the circuit. The circuit enters next high frequency period operating mode I, and keeps circulating the above-mentioned actions of operating modes I~V.

The driving circuit according to the present invention integrates the buck-boost converter and the resonant inverter into a single-stage structure, so that the buck-boost converter and the resonant inverter share an active switch and a trigger signal, and therefore, the circuit is simplified and the loss caused by stage switching is reduced. Moreover, the buck-boost converter operates in a discontinuous-conduction mode (DCM), which allows the circuit to have high power factor, and enables the active switch to be capable of zero-current switching (ZCS), so that the loss caused by switching is largely reduced. In the driving circuit according to the present invention, there's no interaction of power between the buck-boost converter and the resonant inverter, so that the two circuits can be analyzed individually. Moreover, one end of the active switch is grounded, so that the driving circuit according to the present invention has no isolating issue, and the complexity of the circuit and the cost are reduced. Therefore, the driving circuit according to the present invention having simplified circuit, low loss caused by switching, and low manufacturing cost, can be a competitive product after being commercialized.

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms as illustrated, and that all modifications which maintain the spirit and scope of the present invention are within the scope defined by the appended claims.

What is claimed is:

1. A single-stage zero-current switching driving circuit for ultrasonic motor, comprising:
    a buck-boost converter, receiving an input voltage, wherein the buck-boost converter comprises a first diode, a first inductor, a first capacitor and an active switch, the buck-boost converter operates in a discontinuous-conduction mode (DCM), before the trigger pulse cycle of a trigger signal of the active switch, the current of the first inductor decreases to zero; and
    a zero-current switching resonant inverter, connected to the buck-boost converter, wherein the resonant inverter comprises a second inductor, two blocking diodes, a second diode, a second capacitor and a resonant circuit, the two blocking diodes are used to block the interaction of power between the buck-boost converter and the resonant inverter, the resonant inverter generates a high frequency AC voltage so as to drive the ultrasonic motor.

2. The driving circuit as claimed in claim 1, further comprising a low pass filter and a bridge rectifier, wherein the low pass filter comprises a filter inductor and a filter capacitor, the bridge rectifier comprises four rectifier diodes, the low pass filter and the bridge rectifier are used to filter and rectify an AC power source into a DC input power source, and the DC input power source is inputted into the buck-boost converter.

3. The driving circuit as claimed in claim 2, wherein the first diode and the first inductor are connected to a negative terminal of the DC input power source, the first capacitor is connected to the first diode and the first inductor, the active switch is connected to the first capacitor and the first inductor.

4. The driving circuit as claimed in claim 3, wherein the zero-current switching resonant inverter further comprises: the first capacitor and the active switch, the buck-boost converter and the resonant inverter share the first capacitor and the active switch, the active switch is capable of zero-current switching, the two blocking diodes comprise a first blocking diode and a second blocking diode, the first blocking diode is connected to a positive terminal of the DC input power source, the second blocking diode is connected to the first blocking diode, the second inductor is connected to the second blocking diode, the active switch is connected to the first blocking diode and the second blocking diode, the second diode is connected to the second blocking diode and the second inductor, the second diode and the second capacitor are connected in parallel, the resonant circuit is connected to the second capacitor.

5. The driving circuit as claimed in claim 1, wherein the resonant circuit comprises a third inductor and a third capacitor, and the resonant frequency of the resonant circuit is 70 kHz.

6. The driving circuit as claimed in claim 1, further comprising a controller for providing the trigger signal of the active switch.

7. The driving circuit as claimed in claim 1, wherein the first diode and the second diode are flywheel diodes.

* * * * *